United States Patent [19]

Tarbutton et al.

[11] Patent Number: 5,280,067
[45] Date of Patent: Jan. 18, 1994

[54] SUBSTITUTED PENTAFLUOROANTMONIC ACID-SUBSTITUTED ANILINE EPOXY CURING CATALYSTS

[75] Inventors: Kent S. Tarbutton, Lake Elmo; Janis Robins, St. Paul; Virginia C. Markevka, Maplewood, all of Minn.

[73] Assignee: Minnesota Mining and Manufacturing Company, St. Paul, Minn.

[21] Appl. No.: 931,602

[22] Filed: Aug. 18, 1992

Related U.S. Application Data

[63] Continuation-in-part of Ser. No. 900,607, Jun. 18, 1992, abandoned.

[51] Int. Cl.⁵ ............... C08L 63/02; C08L 63/04; C08G 59/68
[52] U.S. Cl. ...................... 525/65; 525/486; 525/528; 525/529; 525/530; 528/92
[58] Field of Search ............... 525/65, 486, 528, 529, 525/530; 528/92

[56] References Cited

U.S. PATENT DOCUMENTS

| | | | |
|---|---|---|---|
| 4,503,211 | 3/1985 | Robins | 528/92 |
| 4,668,758 | 5/1987 | Corley | 528/91 |
| 4,846,905 | 7/1989 | Tarbutton | 525/65 |

FOREIGN PATENT DOCUMENTS

963058 7/1964 United Kingdom.

*Primary Examiner*—Robert E. Sellers
*Attorney, Agent, or Firm*—Gary L. Griswold; Walter N. Kirn; Robert W. Sprague

[57] ABSTRACT

A two-part, thermally curable epoxy composition comprising an epoxy resin; a curing agent prepared from a substituted pentafluoroantimonic acid and a substituted benzene having an amino substituent and an electron-withdrawing substituent on the benzene ring; a polyol; and a toughening agent. The compositions exhibit desirable green strength and pot life.

5 Claims, 1 Drawing Sheet

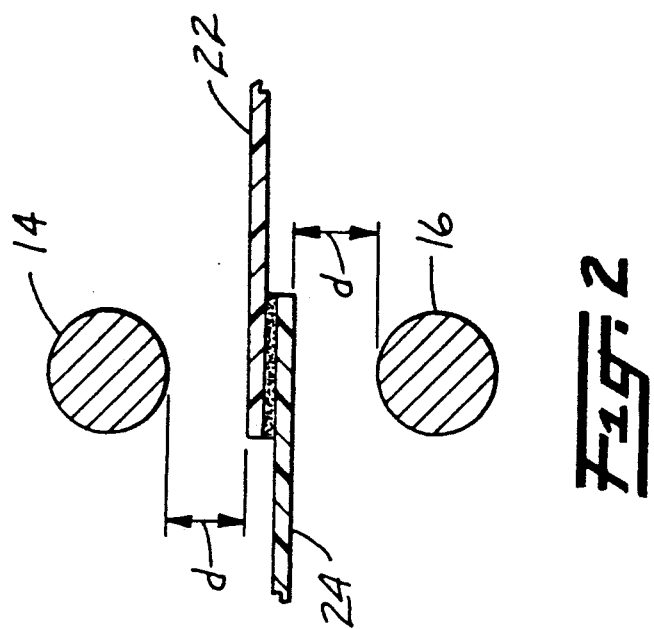
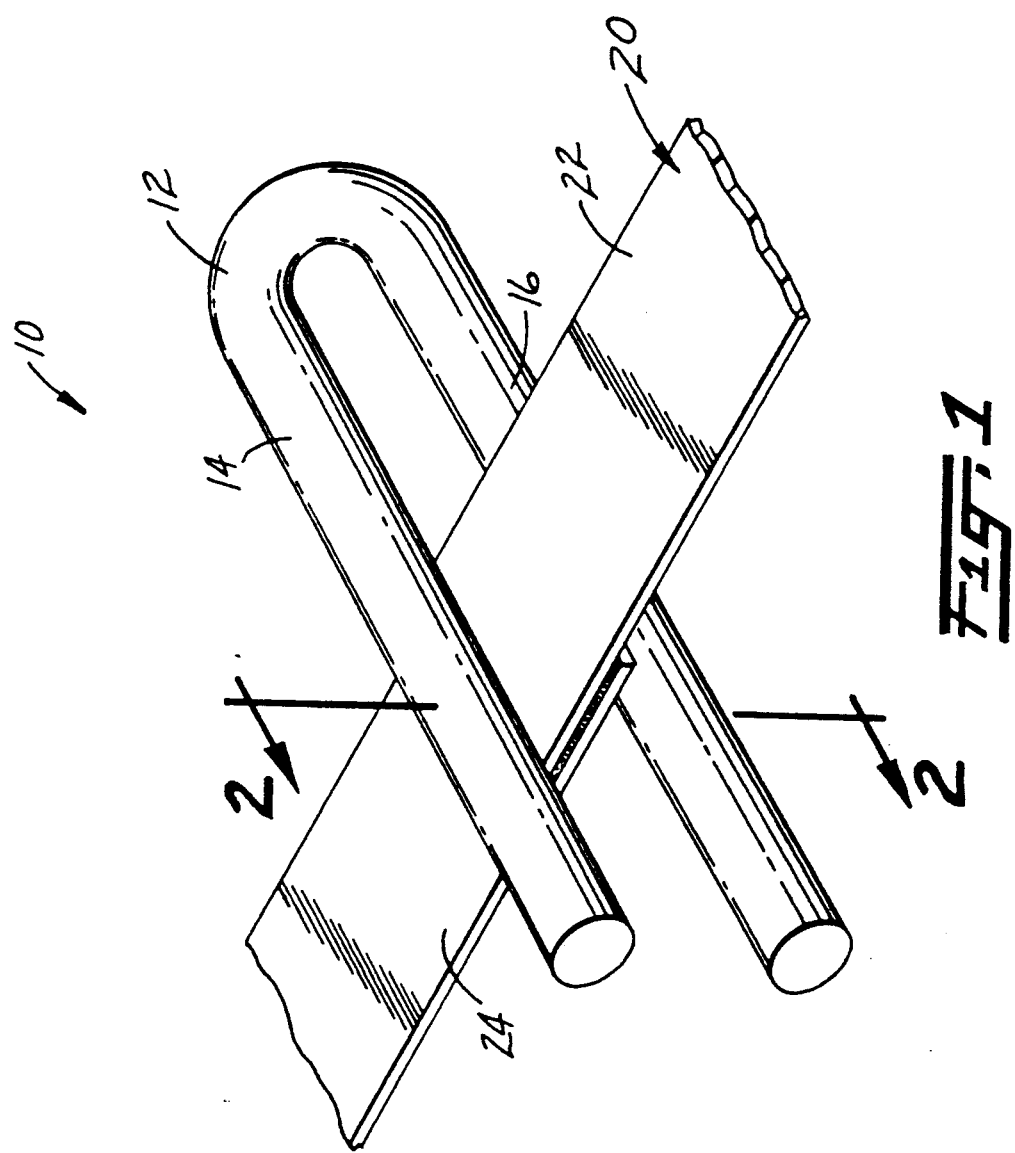

5,280,067

SUBSTITUTED PENTAFLUOROANTIMONIC ACID-SUBSTITUTED ANILINE EPOXY CURING CATALYSTS

CROSS-REFERENCE TO RELATED APPLICATION

This application is a continuation-in-part of U.S.S.N. 07/900,607, filed Jun. 18, 1992, now abandoned.

FIELD OF THE INVENTION

This invention relates to a two-part, thermally curable epoxy composition. This invention also relates to an epoxy adhesive made from the thermally curable epoxy composition.

BACKGROUND OF THE INVENTION

Epoxy compositions are well known in the industry for a variety of uses including structural adhesives. The compositions are typically classified as either one-part, in which the catalyst or curing agent is admixed with the rest of the ingredients, or two-part, in which the catalyst is kept separate from the epoxy composition and mixed only when the epoxy composition is to be used.

In certain applications it is desirable to increase the speed at which the epoxy composition reacts so that a "green strength" can be achieved when the composition is heated for a very short period of time. As used herein, the term "green strength" refers to the shear strength of an epoxy composition that has been partially cured, i.e., some, but not all of the epoxy groups are reacted. Upon further heating, the epoxy composition cures and reaches its ultimate strength wherein most of the epoxy groups are reacted. An example of such an application is in the automotive industry where steel surfaces are bonded together with epoxy adhesives by induction heating. The adhesive is fully cured by thermal heating at a subsequent time.

There have been various attempts to make compositions having the optimum balance of properties between structural adhesive strength, speed of cure, and pot life. However, it has been found that as the speed at which the curing reaction occurs increases, the pot life decreases for one-part compositions. Additionally, achieving complete reaction, i.e., wherein substantially all of the epoxide functional groups are consumed, may require longer cure times and/or higher temperatures.

Corley (U.S. Pat. No. 4,668,758) discloses an epoxy resin composition containing a cationic curing agent and a cure-retarding amount of a diarylamine.

Robins (U.S. Pat. No. 4,503,211) discloses the use of an epoxy resin curing agent comprising the liquid salt of a substituted pentafluoroantimonic acid and an aromatic amine selected from the group consisting of aniline and hindered amines including substituted anilines having an electron-donating substituent on the benzene ring.

Tarbutton et al. (U.S. Pat. No. 4,846,905) discloses thermally curable one-part epoxy compositions catalyzed by a liquid salt of a substituted pentafluoroantimonic acid and N,N-diethyl-o-toluidine.

Buck et al. (U.K. Pat. Spec. No. 963,058) discloses room temperature storable epoxy resin compositions with a curing agent provided by the amine salt of hydrofluoroboric acid.

For applications such as induction heating to bond steel surfaces, and especially to oily steel surfaces, it would be desirable to have an epoxy resin composition which has an extended pot life after mixing, but which will also develop green strength rapidly upon application of heat over a broad temperature range of about 50° C. to about 200° C. The composition should also provide good structural adhesive properties for bonding as measured by lap shear and T-peel.

BRIEF SUMMARY OF THE INVENTION

In one aspect, the present invention provides a novel, two-part, thermally curable epoxy adhesive composition comprising:
(a) an epoxy resin having an average epoxide functionality of greater than one;
(b) a catalytically effective amount of a curing agent comprising the reaction product of starting materials comprising:
(1) a substituted pentafluoroantimonic acid having the general formula $H^+SbF_5X^-$ wherein X is halogen, a hydroxy, or an OR group wherein OR is the residue of an aliphatic or aromatic alcohol; and
(2) a substituted aniline selected from the group consisting of 4-aminobenzoic acid or a lower alkyl ester thereof, 3-amino-4-chlorobenzoic acid or a lower alkyl ester thereof, 4-amino-2-chlorobenzoic acid or a lower alkyl ester thereof, 5-amino-2-chlorobenzoic acid or a lower alkyl ester thereof, 3-amino-5-nitrobenzoic acid or a lower alkyl ester thereof, 2-bromoaniline, 3-bromoaniline, 4-bromoaniline, 2,4-dibromoaniline, 2-aminoacetophenone, 3-aminoacetophenone, and 4-aminoacetophenone;
(c) an aliphatic polyol, a cycloaliphatic polyol, or an alkanol-substituted arene polyol, or a mixture of two or more of the foregoing, the polyol having about 2 to 18 carbon atoms, at least two hydroxy groups being primary or secondary; and
(d) a toughening agent having an epoxide compatible component substantially soluble in the epoxy resin and an epoxide incompatible component substantially insoluble in the epoxy resin.

Preferred compositions of this invention, when tested according to Test Method A (described below), will not exhibit a viscosity increase of greater than about five-fold. More preferably, any increase in viscosity as measured according to Test Method A will not be greater than about four-fold and most preferably will not be greater than about three-fold.

BRIEF DESCRIPTION OF THE DRAWING

In the annexed drawing:
FIG. 1 is a plan view of an induction heating device showing a bonded coupon; and
FIG. 2 is a cross-sectional view along the line 2—2 of FIG. 1.

DETAILED DESCRIPTION OF THE PREFERRED EMBODIMENTS

The epoxides that are useful in the composition of the present invention can be any organic compound having at least one oxirane ring that is polymerizable by ring opening, i.e., an average epoxy functionality greater than one, and preferably at least two. The epoxides can be monomeric or polymeric, and aliphatic, cycloaliphatic, heterocyclic, aromatic, or mixtures thereof. The preferred epoxides are aromatic and contain more than 1.5 epoxy groups per molecule and preferably more than 2 epoxy groups per molecule.

The useful materials have a molecular weight of about 150 to 10,000, and preferably of about 300 to 1,000. Useful materials include linear polymeric epoxides having terminal epoxy groups (e.g., a diglycidyl ether of a polyoxyalkylene glycol), polymeric epoxides having skeletal epoxy groups (e.g., polybutadiene polyepoxy), and polymeric epoxides having pendant epoxy groups (e.g., a glycidyl methacrylate polymer or copolymer), and mixtures thereof.

Useful epoxide containing materials include compounds having the required molecular weight of the general Formula I:

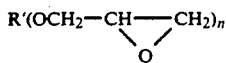

wherein: R' is alkyl, alkyl ether, or aryl, preferably aryl, and n is an integer between 2 and 6. Preferred are aromatic glycidyl ethers such as those prepared by reacting a polyhydric phenol with an excess of epichlorohydrin. Examples of useful phenols include resorcinol, catechol, hydroquinone, and the polynuclear phenols including p,p'-diydroxydibenzyl, p,p'-dihydroxydiphenyl, p,p'-dihydroxyphenyl sulfone, p,p'-dihydroxybenzophenone, 2,2'-dihydroxy-1,1-dinaphthylmethane, and the 2,2', 2,3', 2,4', 3,3', 3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylphenylmethane, dihydroxydiphenylbutylphenylmethane, dihydroxydiphenyltolylethane, dihydroxydiphenyltolylmethylmethane, dihydroxydiphenyldicyclohexylmethane, and dihydroxydiphenylcyclohexane. Also preferred are polyhydric phenolic formaldehyde condensation products as well as polyglycidyl ethers that contain as reactive groups only epoxy groups or hydroxy groups.

Compounds of the above general Formula I, but wherein n=1, are useful as optional additives in the composition of the instant invention.

The useful materials include diglycidyl ethers of bisphenol A and of novolak resins, such as described in "Handbook of Epoxy Resins" by Lee and Nevill, McGraw-Hill Book Co., New York (1967), incorporated herein by reference. Epoxides with flexibilized backbones are also useful. Preferred materials include diglycidyl ethers of bisphenol A and diglycidyl ethers of bisphenol F, and most preferably diglycidyl ethers of bisphenol A, because of the desirable structural adhesive properties that these materials attain upon curing.

Examples of commercially available epoxides useful in the invention include diglycidyl ethers of bisphenol A (e.g., those available under the trademarks Epon 828, Epon 1001, and Epon 1310 from Shell Chemical Co., and DER-331, DER-332, and DER-334 available from Dow Chemical Co.); diglycidyl ethers of bisphenol F (e.g., Epiclon TM830 available from Dainippon Ink and Chemicals, Inc.); silicone resins containing diglycidyl epoxy functionality; flame retardant epoxy resins (e.g., DER 580, a brominated bisphenol type epoxy resin available from Dow Chemical Co.); and 1,4-butanediol diglycidyl ethers.

The curing agent useful in the curable epoxy compositions is the reaction product of a Bronsted acid salt of a substituted pentafluoroantimonic acid and a substituted benzene comprising an amino substituent and at least one electron withdrawing substituent. The mole ratio of the substituted benzene to the substituted pentafluoroantimonic acid is from about 1.05:1 to about 4:1. The substituted benzene may also be referred to as the "amine" or the "amine component" in the instant specification. The substituted pentafluoroanitmonic acid is of the general Formula II

   II wherein X is halogen, hydroxy, or an OR group wherein OR is the residue of an aliphatic or aromatic alcohol. Preferably, the aliphatic or aromatic alcohol has a molecular weight of from about 32 to about 100,000, and a primary or secondary hydroxyl functionality of at least 1, and more preferably, at least 2. The substituted pentafluoroantimonic acid wherein X is halogen or hydroxy is prepared by adding one mole of antimony pentafluoride in sulfur dioxide or other suitable solvent to one mole of hydrogen halide, or water. For salts in which X is OR, one molar equivalent of antimony pentafluoride is mixed with one or more molar equivalents of an alcohol at the reaction temperature. An example of a preferred alcohol is diethylene glycol.

The substituted benzene employed in the practice of the present invention comprises an amino substituent and at least one electron-withdrawing substitutent. Preferred electron withdrawing substituents include carboxy, a $C_1$-$C_4$ alkyl carboxylate, halogen and nitro. Electron-withdrawing substituents such as cyano, —SCH$_3$, —SO, —SO$_2$, and —SO$_3$ are generally not suitable since they will react with the curing agent. Preferred substituted benzenes include 4-aminobenzoic acid or a $C_1$-$C_4$ alkyl ester thereof, 3-amino-4-chlorobenzoic acid or a $C_1$-$C_4$ alkyl ester thereof, 4-amino-2-chlorobenzoic acid or a $C_1$-$C_4$ alkyl ester thereof, 5-amino-2-chlorobenzoic acid or a $C_1$-$C_4$ alkyl ester thereof, 3-amino-5-nitrobenzoic acid or a $C_1$-$C_4$ alkyl ester thereof, 2-bromoaniline, 3-bromoaniline, 4-bromoaniline, 2,4-dibromoaniline, 2-aminoacetophenone, 3-aminoacetophenone, and 4-aminoacetophenone.

The acid portion of the curing agent is used in a catalytically effective amount in the practice of the present invention. The amount of curing agent generally will range from about 0.10 to about 8 parts by weight per 100 parts of the total amount of epoxide used. The curing agent will preferably be present in an amount of about 0.5 to about 4 by weight, and most preferably about 1 to about 2 by weight per 100 parts of the total amount of epoxide used.

The polyol useful in the present invention is an aliphatic, a cycloaliphatic, or an alkanol-substituted arene polyol, or a mixture of two or more of the foregoing. The polyol(s) have 2 to 18 carbon atoms and at least two hydroxy groups are primary or secondary (i.e., at least two primary groups, at least two secondary groups, or at least one primary group and at least one secondary group). Preferably, the polyol comprises at least three hydroxy groups with at least one hydroxy group, preferably at least two hydroxy groups, being primary. As used herein, the term "alkanol-substituted arene polyol" refers to arene structures which are substituted with at least two alkanol groups, typically methanol. Additionally, the term "arene" as utilized herein refers to hydrocarbons containing at least one aromatic ring, e.g. benzene, biphenyl, etc. The polyol preferably is free of amine groups, electron-withdrawing substituents such as those indicated above not to be desired as substituents in the substituted benzene, strong acids, and large groups that cause steric hindrance in the alpha position in relation to the carbon attached to the methylol group of the polyol. The polyol aids in chain lengthening and prevents excessive crosslinking of the epoxide during curing.

Examples of useful polyols include alkylene glycols, such as 1,2-ethanediol, 1,3-propanediol, 1,4-butanediol, and 2-ethyl-1,6-hexanediol; polyhydroxyalkanes, such as glycerine, trimethyloethane, pentaerythritol, 1,3-butanediol, 2-ethyl-1,3-pentanediol, and 2,2-oxydiethanol; sorbitol, 4-cyclohexane dimethanol; 1,4-benzene dimethanol, 1,6-hexanediol, polyalkoxylated bisphenol A derivatives, and blends thereof. Other examples of useful polyols are disclosed in the heretofore mentioned U.S. Pat. No. 4,503,211. Examples of preferred polyols include 1,6-hexanediol, 1,4-cyclohexanedimethanol, diethylene glycol, polyalkoxylated bisphenol A derivatives, and blends thereof.

The polyol is preferably present in an amount sufficient to provide a hydroxy to epoxy equivalents ratio (OH/Epoxy Ratio) in the composition between about 0.1:1 and 1.5:1, more preferably between about 0.25:1 and 1:1, and most preferably between about 0.4:1 and 0.9:1.

The polymeric toughening agents useful in the present invention have an epoxide incompatible component substantially insoluble in the epoxy resin and an epoxide compatible component substantially soluble in the epoxy resin. It is important that the toughening agent contains no functional groups which would poison the curing agent such as those indicated as not being desirable substituents in the substituted benzene.

The toughening agents which are useful in the present invention include polymeric compounds having both a rubbery phase and a thermoplastic phase such as graft copolymers having a polymerized diene rubbery core and a polyacrylate or polymethacrylate shell; graft copolymers having a rubbery core with a polyacrylate or polymethacrylate shell; and elastomeric particles polymerized in situ in the epoxide from free-radical polymerizable monomers and a copolymeric stabilizer.

Specific examples of useful toughening agents include graft copolymers having a polymerized diene rubbery backbone or core to which is grafted a shell of an acrylic acid ester or methacrylic acid ester, monovinyl aromatic hydrocarbon, or a mixture thereof, such as disclosed in U.S. Pat. No. 3,496,250, incorporated herein by reference. Preferable rubbery backbones comprise polymerized butadiene or a polymerized mixture of butadiene and styrene. Preferable shells comprising polymerized methacrylic acid esters are lower alkyl ($C_1$–$C_4$) substituted methacrylates. Preferable monovinyl aromatic hydrocarbons are styrene, alpha-methylstyrene, vinyltoluene, vinylxylene, ethylvinylbenzene, isopropylstyrene, chlorostyrene, dichlorostyrene, and ethylchlorostyrene.

Further examples of useful toughening agents are acrylate core-shell graft copolymers wherein the core or backbone is a polyacrylate polymer having a glass transition temperature ($T_g$) below about 0° C., such as polybutyl acrylate or polyisooctyl acrylate to which is grafted a polymethacrylate polymer (shell) having a $T_g$ about 25° C. such as polymethylmethacrylate.

Still further examples of toughening agents useful in the invention are elastomeric particles that have a $T_g$ below about 25° C. and have been polymerized in situ in the epoxide before mixing with the other components of the composition. These elastomeric particles are polymerized from free-radical polymerizable monomers and a copolymerizable polymeric stabilizer that is soluble in the epoxide. The free-radical polymerizable monomers are ethylenically unsaturated monomers or diisocyanates combined with coreactive difunctional hydrogen compounds such as diols, diamines, and alkanolamines. Examples of these elastomeric particles are disclosed in U.S. Pat. No. 4,525,181. These particles are commonly referred to as "organosols".

Still other toughening agents are rubber modified liquid epoxy resins. An example of such a resin is Kraton ™ RP6565 Rubber available from Shell Chemical Company. The modified epoxy resin is made from 85% by weight Epon ™ 828 and 15% by weight of a Kraton ™ rubber. The Kraton ™ rubbers are known in the industry as elastomeric block copolymers.

The toughening agent is preferably used in an amount equal to about 3 to 35 parts by weight, and more preferably about 5 to 15 parts by weight per 100 parts by weight of the epoxy resin. The toughening agents of the present invention add strength to the composition after curing without reacting with the epoxide or without interfering with curing.

In some cases reactive diluents may be added to control the flow characteristics of the adhesive composition. Suitable diluents have at least one reactive terminal end portion and preferably, a saturated or unsaturated cyclic backbone. Preferred reactive terminal ether portions include glycidyl ether. Examples of suitable diluents include the diglycidyl ether of resorcinol, diglycidyl ether of cyclohexane dimethanol, diglycidyl ether of neopentyl glycol, triglycidyl ether of trimethylolpropane dipentene, and the divinyl ether of cyclohexanedimethanol. A commercially available reactive diluent is "WC-68" from Rhone Poulenc.

Various other adjuvants can be added to the epoxide composition to enhance properties of the composition before and after curing.

A useful group of adjuvants to enhance adhesion to metals are polyhydroxy benzene carboxylic acids such as gallic acid, digallic acid, and tannic acid. Tannic acid is available from Mallinckrodt, Inc.

Also included among useful adjuvants are nonreactive diluents; plasticizers such as conventional phosphates and phthalates; thixotropic agents such as fumed silica to provide flow control; pigments to enhance color tones such as ferric oxide, brick dust, carbon black, and titanium dioxide; fillers such as talc, silica, magnesium, calcium sulfate, beryllium aluminum silicate; clays such as bentonite; glass and ceramic beads and bubbles; and reinforcing materials, such as woven and nonwoven webs of organic and inorganic fibers such as polyester, polyimide, glass fibers, and ceramic fibers. The adjuvants can be added in an amount effective for the intended purpose; typically, amounts up to about 50 parts of adjuvant per total weight of formulation can be used.

The epoxy composition of the present invention may be formulated in a variety of ways. By providing a two-part composition, with the two parts being combinable prior to use of the composition, desirable shelf-life or pot-life of the composition is obtained. In some applications, it is desirable to select the amounts and the distribution of the ingredients in each part to provide viscosity control and better mixing of the two parts. For example, the fillers can be divided so that each part contains a portion of the fillers used.

The epoxy composition of the present invention can be cured by any means which allows sufficient heat to start the curing reaction. The means can include conventional ovens, induction heating, infrared radiation, microwave radiation, and immersion into liquid baths. Typically, the curing is conducted at a temperature in the range of about 50° C. to about 200° C. for a time ranging from about 1 second to about 2 hours. The curing time will depend upon the particular process for curing, Induction heating times typically range from about 1–60 seconds while oven curing times can range from about 0.1 to about 2 hours.

The epoxy composition of the present invention is particularly useful in applications where induction heating is used to heat the adhesive to bond oily steel surfaces. In induction heating an electrical current is generated in an induction coil and an electromagnetic field is formed. The bonded metal surfaces are placed in the electromagnetic field, which in turn generates heat in the metal. Heat is conducted from the metal to the epoxy adhesive to at least partially cure the adhesive. The adhesive can be fully cured later by other means such as thermal conduction, etc.

The epoxy adhesive of the present invention can be used for bonding metal to metal, plastic to plastic, and plastic to metal. Examples of metal surfaces include steel, titanium, oily steel, aluminum, and magnesium. Plastic surfaces include polyethylene, polycarbonate, polyester, polyurethane, and urea-formaldehyde. The epoxy adhesive can be used in assembling parts such as for automobiles, aircraft, refrigeration units, etc.

The following non-limiting examples will serve to further illustrate the present invention in greater detail.

TEST PROCEDURES

T-Peel Adhesion Test

Two strips of steel which meet ASTM A619/A619M-82 and measure 25.4 mm by 203 mm by 0.8 mm are degreased with acetone. One surface of each strip is then coated with EDC-0002 TM automotive draw oil (available from Metal Lubricants Co. of Harvey, Ill.), and is allowed to dry (about 1 hour). The oil can be spread on the surface of the strip by using a #10 draw bar (Meyer rod), spreading the oil with a finger, or placing two strips face to face and rubbing to distribute the oil on each of the facing surfaces. Two drops of oil are distributed evenly on the entire top surface of each of the two strips. The approximate dry weight of the oil on the surface is between about 0.5 to 0.9 mg/644 square millimeters. The epoxy adhesive composition being tested is applied to the oiled surfaces of each steel strip and 5 stainless steel spacer wires measuring 0.15 mm in diameter and 25.4 mm in length are placed in the adhesive of one of the strips 25.4 mm apart with the wires running across the width of the strip. The other strip is then placed over the first strip with the adhesive coated surfaces facing each other. The strips are clamped together and placed in a forced air oven at 170° C. for 30 minutes until the adhesive is cured. The laminated strips are then conditioned at about 21° C. for at least two hours. The peel strength is measured using a tensile tester according to ASTM 1876-72 with the strips being pulled apart at a crosshead speed of 50 cm per minute. The T-peel is measured in Newtons per centimeter and the mode of failure is noted as adhesive (A), wherein the adhesive pulls away from the steel strip, cohesive (C), wherein the adhesive splits leaving adhesive on each of the strips, or mixed (M), wherein both modes of failure are observed.

Ultimate Lap Shear Strength

This test measures the ultimate strength that an epoxy adhesive composition will achieve after being fully cured. The lap shear strength is also referred to as the "overlap" shear strength.

Sheets of 0.76 mm thick G-60HDES (hot dipped extra smooth galvanized steel; obtained from National Steel Corporation, Livonia, Minn.) are cut into 25.4 mm by 76.2 mm test coupons and degreased with acetone. EDC-0002 oil is coated onto the bonding surfaces of two coupons by placing one drop of oil on one of the coupons, placing a second coupon on top of the first, and rubbing the two coupons together so that about two-thirds of each coupon is coated with oil. The coupons are then placed oiled side up and allowed to dry for at least two hours at 21° C. The epoxy adhesive composition being tested is spread over one end of the first oiled coupon. Two 25.5 mm lengths of 0.5 mm diameter stainless steel wires are placed in the adhesive parallel to the axis of the coupon and about 8 mm apart. The oiled surface of the other coupon is placed over the adhesive such that there is a 12.7 mm overlap of the coupons and the uncoated ends of the coupons are aligned in opposite directions from each other. The coupons are clamped together and cured at 170° C. for 30 minutes. The prepared samples are conditioned for at least two hours at 21° C. before testing. The lap shear is determined using a tensile tester according to ASTM Test Method D1002-72 with a crosshead speed of 5 cm/min. The lap shear is reported in units of megaPascals (MPA). The failure mode is also noted as described in the T-peel test. Five independent samples involving a particular epoxy adhesive composition are tested and the results are averaged.

Initial Lap Shear Strength After Induction Heating

This test is a measure of the green strength that develops after an induction heating cycle. As shown in FIGS. 1 and 2, the test fixture 10 has a 6.35 mm OD (Outside diameter) round copper induction heating coil 12 formed into a hairpin creating an upper rod 14 and a lower rod 16 with 25.4 mm between them. The heating coil is connected to an S-5 Generator available from Ameritherm Inc., Scottsville, N.Y., which has been de-rated at a maximum power of 2.5 Kw. The power output to the coil was controlled with a Micristar controller. A test sample 20 is prepared as described above in the procedure for Lap Shear, except that the coupons 22 and 24 used are 0.81 mm thick and have a hole (not shown) punched on the uncoated end. The sample 20 is clamped and positioned between the upper and lower rods of the induction heating coil so that the gap between the upper coupon 22 and the upper rod 14 is equal to the distance between the lower coupon 24 and the lower rod 16. This distance is measured to be 4.67 mm (shown as dimension d in FIG. 2). A fastener attached to the hole of one end of the test sample is attached to a permanent fixture while a hook through the hole in the other end is attached to a force gauge. The power is turned on for a 13 second heating cycle, during which time the temperature in the test sample rises to about 149° C. (300° F.). The power is then turned off and, after 30 seconds, the force gauge is pulled at a rate of about 20 to about 50 cm per minute to measure the lap shear strength. The shear force is recorded in MPA. Five independent samples involving a particular epoxy adhesive composition are tested and the results are averaged.

Pot Life

The viscosity change with time is a measure of pot life. As the viscosity increases, the pot life starts to decrease. The viscosity is measured on a Haake RV3 Cone and Plate Rheometer with a PK1, 0.3° rotor. The rheometer is available from Haake Fisons Instruments. The test is conducted at 25° C. at a shear rate of $100^{-1}$ seconds. The viscosity is checked initially, at four hours, and at eight hours, and the viscosities are compared. Viscosity is reported in centipoise (cps).

Preferred compositions of the invention will not exhibit a viscosity increase of greater than eight-fold after 4 hours when tested in accordance with this method. More preferred compositions will not exhibit a viscosity increase of greater than five-fold, and most preferred compositions will not exhibit a viscosity increase of greater than three-fold when tested after four hours.

This test method with any viscosity increase being measured after four hours is referred to as Test Method A in the instant specification and claims.

EXAMPLES

Identification of Components Used in the Examples

Epon TM 828 Epoxy Resin—diglycidyl ether of Bisphenol A having an epoxy equivalent weight of about 190 and an average molecular weight of 350–400, and available from Shell Chemical Company.

Paraloid TM BTA IIIF copolymer—methyl methacrylate/butadiene/styrene copolymer available from Rohm & Haas Company.

"WC-68 Reactive Diluent"—diglycidyl ether of neopentyl glycol having an epoxy equivalent weight of about 135, available from Rhone-Poulenc.

"GP-7I" silica—silicon dioxide having a particle size range from about 20–30 micrometers, available from Harbison-Walker Corp.

Cab-0-Sil TM TS-720 silica—fumed silica available from Cabot Corp.

"B37/2000" glass bubbles—glass bubbles available from Minnesota Mining & Manufacturing Company.

Synfac TM 8024—propylene oxide chain extended, ethylene oxide capped Bisphenol A with a molecular weight of 360, available from Milliken Chemical Corp.

Preparation of Epoxy Composition Premix

The epoxy composition premix for the following examples was prepared by mixing 73.4 parts Epon TM 828 epoxy resin, 15.8 parts Paraloid TM-BTAIIIF core shell copolymer, and 10.4 parts WC-68 Reactive Diluent to make 100 parts of composition. The mixture was stirred with a high shear mixer at about 115° C. for one hour and then cooled to about 21° C.

Preparation of Polyol/Curing Agent Mixture

The acid (SbF$_5$/DEG) was prepared by placing 21.7 g (0.2 mole) of diethylene glycol (DEG) in a 100 ml 3-neck flask equipped with a stirrer, addition funnel, thermometer, and apparatus for exclusion of moisture. The fitted flask and the contents were cooled to about 5° C. With constant stirring, 21.7 g (0.1 mole) of antimony pentafluoride were added dropwise to the DEG over a 10-minute period. The mixture was then allowed to warm to about 21° C.

The curing agent mixture was prepared by dissolving the amine in the polyol (in the examples either Synfac TM 8024, 1,4-cyclohexanedimethanol or a mixture of 1,6-hexanediol and 1,4-cyclohexanedimethanol at about 100° C. When tannic acid was used, the tannic acid was also dissolved along with the amine at 100° C. After cooling to about 21°0 C., the acid was added to the polyol mixture to form the polyol/curing agent mixture. The amount of polyol is selected to give the desired OH/Epoxy ratio for the composition as shown for each example. The amount of amine and acid were selected to give the desired Amine/SbF$_5$ molar ratio shown in the examples.

EXAMPLES 1-5

Epoxy composition premixes and polyol curing agent mixtures were prepared as described above using the specific materials and quantities shown in Table 1. The epoxy composition is shown in the table as the individual components of the composition. The two mixtures were mixed together at room temperature. The required amount of RP 6565 was added and mixed, and then the fillers (GP-7I silica, B37/200 glass bubbles, and TS-720 fumed silica) were added and thoroughly mixed to make epoxy adhesive compositions. The adhesive compositions were tested for initial shear strength, ultimate shear strength, T-peel adhesion, and viscosity (Test Method A) according to the test procedures described above. Test results are shown in Table 2.

TABLE 1

| EPOXY ADHESIVE COMPOSITIONS - PERCENT BY WEIGHT | | | | | |
|---|---|---|---|---|---|
| | Ex. 1 | Ex. 2 | Ex. 3 | Ex. 4 | Ex. 5 |
| OH/Epoxy Ratio | .55 | .65 | .55 | .66 | .48 |
| Amine/SbF$_5$ Ratio | 4/1 | 4/1 | 4/1 | 4/1 | 4/1 |
| Epon TM 828 | 40.5 | 39.9 | 40.1 | 39.0 | 46.7 |
| Paraloid TM BTA IIIF | 6.8 | 6.6 | 6.7 | 6.5 | 7.0 |
| WC 68 | 4.4 | 4.3 | 4.4 | 4.3 | 4.7 |
| 1,4-cyclohexanedimethanol | 4.5 | 5.2 | 9.6 | 11.3 | 4.4 |
| 1,6-hexanediol | 4.5 | 5.2 | 0 | 0 | 4.4 |
| Kraton TM RP 6565* | 5.3 | 5.2 | 5.3 | 5.1 | 0 |
| Ethyl-4-aminobenzoate | 3.2 | 3.1 | 3.2 | 3.1 | 2.6 |
| SbF$_5$/DEG | 2.1 | 2.0 | 2.1 | 2.0 | 1.7 |
| Tannic Acid | 1.0 | 0.9 | 0.9 | 0.9 | .8 |
| GP-7I Silica | 21.7 | 21.7 | 21.7 | 21.7 | 21.7 |
| B37/2000 glass bubbles | 4.3 | 4.3 | 4.3 | 4.3 | 4.3 |
| TS-720 | 1.8 | 1.8 | 1.8 | 1.8 | 1.8 |

*As received from Shell - contains 85% Epon TM 828

TABLE 2

| TEST RESULTS FOR EXAMPLES 1-5 | | | | | | |
|---|---|---|---|---|---|---|
| | Shear Strength - MPA | | T-Peel | Viscosity (cps) × 1000 | | |
| Ex. | Initial | Ultimate | N/cm | Initial | 4 Hours | 8 Hours |
| 1 | 1.83 | 17.13 | 54.3 | 52 | 104 | 291 |
| 2 | 1.39 | 17.55 | 50.1 | 34 | 120 | 130 |
| 3 | 1.97 | 15.93 | 56.0 | 71 | 150 | 603 |
| 4 | 1.74 | 16.98 | 52.5 | 75 | 354 | gelled |
| 5 | 2.03 | 17.58 | 56.0 | 44 | 61 | 73 |

The data in Table 2 show that these epoxy adhesive compositions exhibit desirable green strength after induction heating, as well as good structural strength and pot life (Test Method A).

EXAMPLES 6-20

Epoxy adhesive compositions were prepared according to the procedures described above for Examples 1-5 using the formulations shown in Table 3. All of the formulations were made to have an OH/Epoxy ratio of 0.7, and used Synfac TM 8024 as the polyol. The premix is not listed as separate components.

The adhesive compositions were tested for initial shear strength, ultimate shear strength, T-peel, and pot life (Test Method A) according to the procedures described above. Test results are shown in Table 4.

TABLE 3
EPOXY FORMULATIONS FOR EXAMPLES 5-14 BY WEIGHT PERCENT

| Ex | Amine Type | Amine /SbF5 Ratio | Amine % | Polyol % | Premix % | SbF5 /DEG % | GP-71 silica % | B37/2000 glass bubbles % | TS-720 silica % |
|---|---|---|---|---|---|---|---|---|---|
| 6 | Ethyl-4-aminobenzoate | 4/1 | 2.4 | 25.8 | 42.4 | 1.6 | 21.7 | 4.3 | 1.8 |
| 7 | Ethyl-4-aminobenzoate | 2/1 | 1.2 | 26.2 | 43.2 | 1.6 | 21.7 | 4.3 | 1.8 |
| 8 | 4-aminobenzoic acid | 4/1 | 2.0 | 25.9 | 42.7 | 1.6 | 21.7 | 4.3 | 1.8 |
| 9 | 4-aminobenzoic acid | 2/1 | 1.0 | 26.3 | 43.3 | 1.6 | 21.7 | 4.3 | 1.8 |
| 10 | 3-bromoaniline | 1.5/1 | 1.0 | 26.3 | 43.3 | 1.6 | 21.7 | 4.3 | 1.8 |
| 11 | 3-amino-4-chlorobenzoic acid | 4/1 | 2.5 | 25.7 | 42.4 | 1.6 | 21.6 | 4.3 | 1.8 |
| 12 | 4-amino-2-chlorobenzoic acid | 4/1 | 2.5 | 25.7 | 42.4 | 1.6 | 21.7 | 4.3 | 1.8 |
| 13 | 5-amino-2-chlorobenzoic acid | 2/1 | 1.25 | 26.1 | 42.9 | 1.6 | 21.9 | 4.4 | 1.8 |
| 14 | 3-amino-5-nitrobenzoic acid | 4/1 | 2.7 | 25.7 | 42.3 | 1.6 | 21.6 | 4.3 | 1.8 |
| 15 | 2,4-dibromoaniline | 4/1 | 3.7 | 25.4 | 41.9 | 1.6 | 21.4 | 4.3 | 1.8 |
| 16 | 4-bromoaniline | 1.5/1 | 1.0 | 26.1 | 43.1 | 1.6 | 22.0 | 4.4 | 1.8 |
| 17 | 2-bromoaniline | 1.5/1 | 1.0 | 26.1 | 43.1 | 1.6 | 22.0 | 4.4 | 1.8 |
| 18 | 2-aminoacetophenone | 2/1 | 1.0 | 26.1 | 43.1 | 1.6 | 22.0 | 4.4 | 1.8 |
| 19 | 3-aminoacetophenone | 2/1 | 1.0 | 26.1 | 43.1 | 1.6 | 22.0 | 4.4 | 1.8 |
| 20 | 4-aminoacetophenone | 2/1 | 1.0 | 26.1 | 43.1 | 1.6 | 22.0 | 4.4 | 1.8 |

TABLE 4
TEST RESULTS FOR EXAMPLE 6-20

| Ex. | Shear Strength - MPA Initial | Shear Strength - MPA Ultimate | T-Peel N/cm | Viscosity (cps) × 1000 Initial | Viscosity (cps) × 1000 4 Hours | Viscosity (cps) × 1000 8 Hours |
|---|---|---|---|---|---|---|
| 6 | 0.37 | 15.15 | 51 | 54 | 82 | 416 |
| 7 | 0.83 | 16.51 | 58 | 38 | 229 | gelled |
| 8 | 0.69 | 15.86 | 53 | 101 | 99 | 317 |
| 9 | 0.74 | 16.45 | 61 | 64 | 183 | gelled |
| 10 | 0.77 | 17.25 | 63 | 67 | 78 | 241 |
| 11 | 0.90 | 14.58 | not determined | 146 | gelled | not determined |
| 12 | 0.18 | 15.42 | not determined | 90 | 175 | 592 |
| 13 | 0.80 | 16.42 | not determined | 59 | 93 | not determined |
| 14 | 0.98 | 14.91 | not determined | 61 | gelled | not determined |
| 15 | 0.77 | 15.71 | not determined | 67 | gelled | not determined |
| 16 | 0.83 | 16.63 | 63 | 55 | 53 | 50 |
| 17 | 0.66 | 16.26 | not determined | 296 | gelled | not determined |
| 18 | 0.63 | 16.33 | not determined | 90 | gelled | not determined |
| 19 | 0.12 | 17.53 | 60 | 61 | 59 | 76 |
| 20 | 0.54 | 16.66 | 60 | 72 | 572 | gelled |

The results in Table 4 show that these epoxy adhesives exhibit desirable green strength after induction heating, as well as good structural strength and pot life (Test Method A).

EXAMPLE 21

Part A of a two part adhesive composition was prepared as described above in the section entitled Preparation of Polyol/Curing Agent Mixture using the amounts of ingredients shown below. The silica and glass bubbles were added to the mixture after it was cooled to room temperature.

| Part A | Parts By Weight |
|---|---|
| 1,6-hexanediol | 19.88 |
| 1,4-cyclohexanedimethanol | 19.88 |
| Tannic Acid | 3.24 |
| Ethyl-4-aminobenzoate | 10.84 |
| SbF5/DEG | 7.12 |
| GP-71 TM silica | 22.60 |
| B37/2000 TM glass bubbles | 13.60 |
| TS-720 TM silica | 2.85 |

Part B was prepared as described above in the section entitled Preparation of Epoxy Composition Premix using the amounts of ingredients shown below. The silica and glass bubbles were added after the mixture was cooled to room temperature.

| Part B | Parts by Weight |
|---|---|
| Epon TM 828 | 60.18 |
| WC-68 Reactive Diluent TM | 5.94 |
| Paraloid TM BTA IIIF | 9.00 |
| GP-71 TM silica | 20.87 |
| B 37/2000 TM glass bubbles | 1.40 |
| TS-720 TM silica | 2.61 |

An adhesive composition was prepared by mixing Part A to Part B in a 1:2.5 volume ratio.

The composition had an initial shear strength of 0.8 MPA and an ultimate shear strength of 18.1 MPA. The T-peel was 52.5 N/cm.

COMPARATIVE EXAMPLES C1-C8

Epoxy compositions shown in TABLE 5 were prepared as described in Examples 1-4 except that various curing agents representative of the prior art were used. Examples C1-C2 used a curing agent made from aniline with alkyl substituents which are electron donating.

Examples C3-C7 used a curing agent made from diarylamines.

Example C8 used a curing agent using the preferred amines of the invention with tetrafluoroboric acid.

Examples C1 and C2 had adequate pot life (Test Method A) and good ultimate shear strength, 17.53 MPA and 16.75 MPA, respectively. However, both samples had no green strength after induction heating.

Examples C3-C7 cured within a minute of mixing so no further testing was done. The potlife of all these compositions was inadequate.

Example C8 had adequate pot life (Test Method A), but no green strength, and a very low lap shear strength of 3.8 MPA.

Example C9 was prepared as described in Example 1 except that the SbF$_5$/DEG was omitted. An overlap shear sample was prepared and cured at 170° C. for 30 minutes. The resulting composition was soft and tacky with no shear strength. This test shows that the amine alone will not cure the epoxy adhesive.

Reasonable modifications and variations are possible from the foregoing disclosure without departing from either the spirit or the scope of the present invention as defined in the claims.

TABLE 5

| EPOXY FORMULATIONS FOR COMPARATIVE EXAMPLES C1-C8 BY WEIGHT PERCENT | | | | | | | | |
|---|---|---|---|---|---|---|---|---|
| Ex | Amine | Amine /SbF$_5$ Ratio | Amine % | Polyol % | Premix % | SbF$_5$/ DEG % | GP-71 silica % | B37/2000 glass bubbles % | TS-720 silica % |
| C1 | N,N'-Dimethyl-2,6-diethylaniline | 2/1 | 1.3 | 26.1 | 43.0 | 1.6 | 22.0 | 4.4 | 1.8 |
| C2 | 2-Methyl-6-t-butylaniline | 4/1 | 1.2 | 26.1 | 43.0 | 1.6 | 22.0 | 4.4 | 1.8 |
| C3 | Diphenylamine | 2/1 | 1.3 | 26.2 | 43.0 | 1.6 | 22.0 | 4.4 | 1.8 |
| C4 | Diphenylamine | 6/1 | 3.7 | 25.5 | 42.1 | 1.6 | 21.1 | 4.4 | 1.8 |
| C5 | Diphenylamine-2,2'-dicarboxylic acid | 2/1 | 1.9 | 26.1 | 42.8 | 1.6 | 22.0 | 4.4 | 1.8 |
| C6 | N-Phenylanthranilic acid | 2/1 | 1.6 | 26.1 | 42.7 | 1.6 | 22.0 | 1.4 | 1.8 |
| C7 | Vanlube SL* | 2.8/1 | 2.9 | 26.0 | 42.4 | 1.6 | 21.8 | 4.4 | 1.8 |
| C8 | Ethyl-2-aminobenzoate | 4/1 | 2.4 | 26.1 | 42.8 | **0.8 | 21.8 | 4.4 | 1.8 |

*An alkylated diphenyl amine available from R. T. Vanderbilt Co., Inc.
**Tetrafluoroboric acid was used with a preferred amine

We claim:

1. A two-part thermally curable epoxy adhesive composition comprising:
   (a) an epoxy resin having an average epoxide functionality of greater than one;
   (b) a catalytically effective amount of a curing agent comprising the reaction product of
      (1) a substituted pentafluoroantimonic acid having the general formula H+SbF$_5$X$^-$ wherein X is halogen, a hydroxy, or an OR group wherein OR is the residue of an aliphatic or aromatic alcohol; and
      (2) a substituted aniline selected from the group consisting of 4-aminobenzoic acid or a lower alkyl ester hereof, 4-amino-2-chlorobenzoic acid or a lower alkyl ester thereof, 5-amino-2-chlorobenzoic acid or a lower alkyl ester thereof, 3-amino-5-nitrobenzoic acid or a lower alkyl ester thereof, 2-bromoaniline, 3-bromoaniline, 4-bromoaniline, 2,4-dibromoaniline, 2-aminoacetophenone, 3-aminoacetophenone and 4-aminoacetophenone;
   (c) an aliphatic polyol, a cycloaliphatic polyol, or an alkanol-substituted arene polyol, or a mixture of two or more of the foregoing said polyols having about 2 to 18 carbon atoms, at least two hydroxy groups being primary or secondary; and
   (d) a toughening agent that does not react with the epoxy resin during curing and having an epoxide compatible component substantially soluble in said epoxy resin and an epoxide incompatible component substantially insoluble in said epoxy resin.

2. A composition according to claim 1, further characterized in that when tested in accordance with Test Method A which measures viscosity at four hours at 25° C. at a shear rate of 100$^{-1}$ seconds, said composition will not exhibit a viscosity increase greater than about eight-fold.

3. A composition according to claim 2, wherein said viscosity increase is not greater than about five-fold.

4. A composition according to claim 3, wherein said viscosity increase is not greater than about three-fold.

5. A composition according to claim 1, further comprising tannic acid.

* * * * *

UNITED STATES PATENT AND TRADEMARK OFFICE
CERTIFICATE OF CORRECTION

PATENT NO. : 5,280,067
DATED : January 18, 1994
INVENTOR(S) : Tarbutton et al.

It is certified that error appears in the above-identified patent and that said Letters Patent is hereby corrected as shown below:

Col. 2, line 31     "2 4-"    should be    --2,4- --

Col. 5, line 15     "4-cyclohexane" should be --1,4-cyclohexane--

Col. 10, line 10     "21°OC.," should be --21°C.,--

Signed and Sealed this

Fifth Day of July, 1994

*Attest:*

BRUCE LEHMAN

*Attesting Officer*     *Commissioner of Patents and Trademarks*